NOISE CANCELLATION CIRCUIT FOR MAGNETIC STORAGE SYSTEMS

Filed June 25, 1962 2 Sheets-Sheet 1

INVENTORS
CONRAD J. KAISER
MARSHALL R. BOGGIO
ROBERT J. MELNICK
By George A. Sullivan
Agent Sept. 21, 1965 C. J. KAISER ETAL 3,208,054

NOISE CANCELLATION CIRCUIT FOR MAGNETIC STORAGE SYSTEMS

Filed June 25, 1962 2 Sheets-Sheet 2

INVENTORS
CONRAD J. KAISER
MARSHALL R. BOGGIO
ROBERT J. MELNICK

By George Sullivan
Agent

United States Patent Office 3,208,054
Patented Sept. 21, 1965

3,208,054

NOISE CANCELLATION CIRCUIT FOR MAGNETIC STORAGE SYSTEMS

Conrad J. Kaiser, Dunellen, Marshall R. Boggio, Point Pleasant, and Robert J. Melnick, Woodbridge, N.J., assignors to Lockheed Aircraft Corporation, Burbank, Calif.

Filed June 25, 1962, Ser. No. 204,721
3 Claims. (Cl. 340—174)

Figure 1:
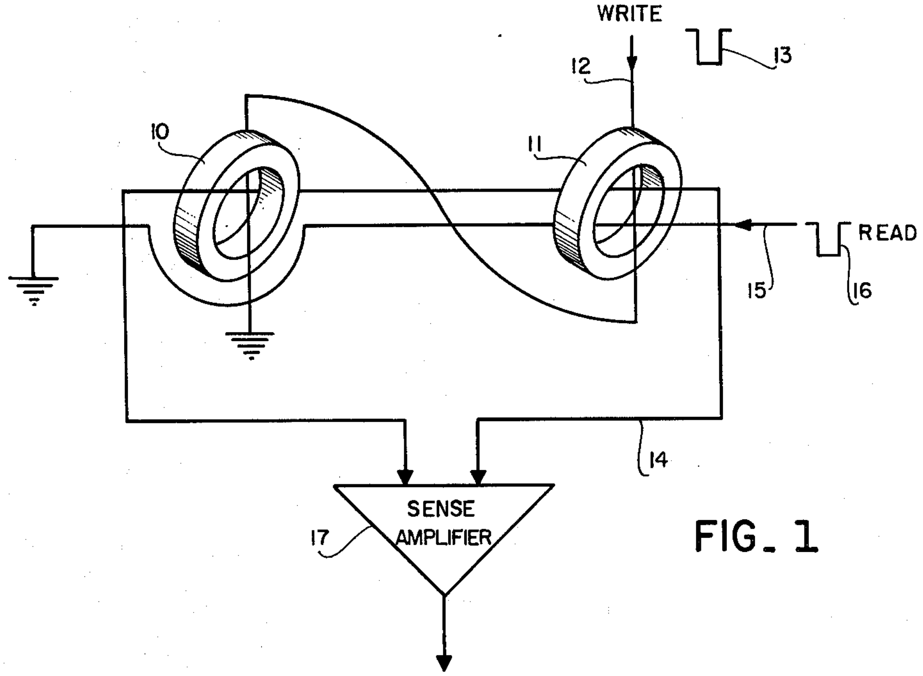

This invention relates to magnetic storage systems and more particularly to a noise cancellation circuit for reducing extraneous noise pulses in the sensed output of magnetic storage systems. The invention allows reliable magnetic storage system operation to occur in the presence of input data lines which are quite "noisy."

The "magnetic storage systems" referred to herein employ magnetic storage elements exhibiting substantially square hysteresis loop characteristics whereby either of two magnetic saturation states may be assumed by the element depending upon the polarity of a magnetomotive force applied thereto. Such storage systems have numerous uses in both the storage and handling of digital information. In the computer art, for one example, magnetic storage systems are used as buffers. In logic circuits, for another example, magnetic storage systems are used as shift registers and counters.

The magnetic storage elements are usually in the form of magnetic cores and will be so identified herein for convenience; however, any magnetic storage device having substantially square hysteresis loop characteristics such as certain magnetic thin films may be similarly employed in accordance with these teachings.

The circuit of this invention provides a most simple means for suppression of extraneous noise, which is present in the input (or "write") lines, so as to prevent this noise from appearing in the sensed output of magnetic storage systems. Specifically, two storage elements or cores, per bit, are employed where a common "write" winding threads both cores in the same direction with the "sense" winding passing through each core in a different direction. The "read" winding threads only one core. This gives good common mode rejection to all induced noise on the sense winding, since "write winding" noise which is induced in the sense winding from each core is 180° out of phase and hence, cancels out. The desired read pulse, however, causes a pulse to be induced on the sense winding which is not bucked out by the second core. Therefore, the desired pulse is unaffected by the differential winding arrangement, while the undesired noise is effectively suppressed. This permits the use of simple single-ended sense amplifiers while retaining the common mode rejection of a differential system.

Prior art magnetic storage systems generally involve the use of single-ended sense windings and differential type sense amplifiers. In such configurations, one core per input is used along with a single unbalanced sense winding. The noise present on the input or "write" line is inductively coupled into the sense winding due to the transformer action of the core itself without the core actually having changed its state of magnetism. It occurs regardless of the tuning or gating of the core read or write circuitry and, to suppress the noise, requires the use of differential-type sense amplifiers. While this technique effectively provides the necessary common mode rejection in the amplifier output, the differential-type sense amplifier is somewhat more sophisticated than a single-ended sense amplifier, requiring additional components and power and often separate "floating" sense amplifier power supplies which result in still further circuit complexity.

A principal object of this invention is to provide a simple noise cancellation circuit for suppressing extraneous noise in the sensed ouput of magnetic storage systems.

Another object of this invention is to provide a noise cancellation circuit for magnetic storage systems which will provide good common mode rejection even when using an ordinary single-ended sense amplifier.

Still another object of this invention is to provide a low power magnet storage system allowing the use of common power supplies.

Figure 2:
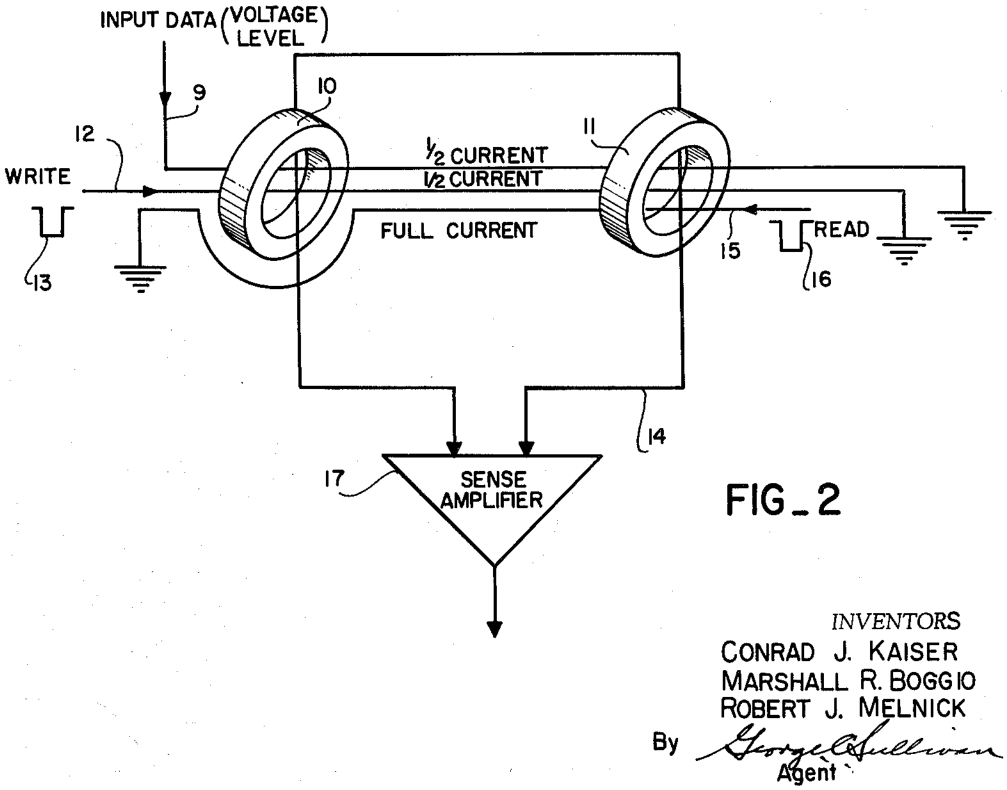
Figure 3:
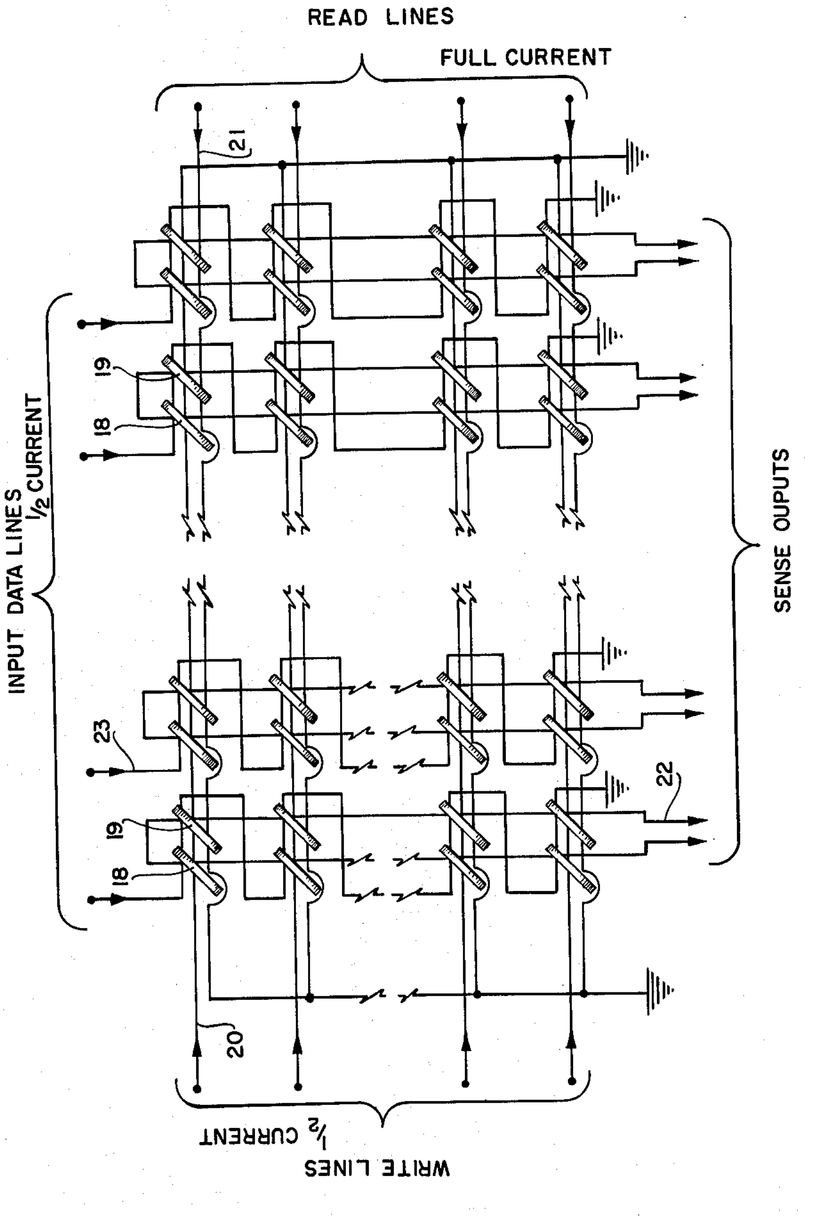

Further and other objects will become apparent from a reading of the folding detail description especially when considered in combination with the accompanying drawing wherein:

FIGURES 1 and 2 illustrate the basic noise cancellation circuit of this invention; and FIGURE 3 shows a two-dimensional core array utilizing the noise cancellation circuit.

Referring now to FIGURE 1, there are two magnetic cores 10 and 11 threaded in the same sense by a single write line 12 so that on application of a write pulse 13, both cores will assume a common state of magnetism. A sense line 14 threads both cores 10 and 11 but in opposite directions while a read line 15 threads only one of the two cores. This arrangement rejects by cancellation all induced noise on the sense line from the write line since noise which is induced in the sense line from both cores is 180° out of phase.

A pulse 16 applied to read line 15, however, causes only the one core 11 to shift its state of magnetism and thereby induce an output pulse on the sense line which is not bucked out by the second core. This pulse appearing in line 14 is applied to sense amplifier 17 as the stored digit output of the two core magnetic storage system.

Alternatively, the two-core configuration of FIGURE 1 can be represented as shown in FIGURE 2. The two figures are identical in every respect except that the single write line 12, of FIGURE 1 has been broken down into two write lines 12 and 9 in FIGURE 2. Whereas in FIGURE 1 write line 12 carried full switching current for the cores, in FIGURE 2 write lines 12 and 9 each carry one-half of the total current required to switch the cores. In this manner, the input data can be utilized to activate line 9, but the data will not be set into the cores until a write pulse activates line 12. This coincident current arrangement of the write windings represents the practical case in wiring the core configuration of FIGURES 1 and 2 into a usable memory system.

It should be noted that upon reading out of the stored information from a pair of cores this information must then be rewritten. Since the "write" current is of an opposite direction from the "read" current, and furthermore since only one of the cores in the pair changed state for the sensing of information, the re-write will also cause a pulse to occur on the output sense winding. However, the sensing of this rewrite pulse is of opposite polarity from the sensing of the normal readout pulse and hence is easily discriminated against by the sense amplifier. For the induced common mode noise however, this is not so, since the common mode noise may be in phase with the desired readout pulse and may thereby be interpreted by the system as a bonafide readout pulse thereby causing an error to occur. The elimination of such common mode noise is the primary concern in this invention.

The two-core cell of FIGURE 2 is capable of handling one bit of information at a time. Simultaneous bit storage capacity, as well understood by those skilled in the art, is increased by simply increasing the number of such cells employed. By combining cells in a matrix like that shown in FIGURE 3, any desired storage capacity may be obtained.

In FIGURE 3, a plurality of cells, each made up of core pairs 18 and 19 like cores 10 and 11 in FIGURE 2, are arranged in rows and columns. A "half current" write line 20 is provided for each row of cells and threads both cores of each of the cells in the row in the same sense. A second "half current" write line (input data line) 23 is provided for each pair of columns, and threads the two cores in a given row in the same sense as does line 20. When coincident current occurs between lines 20 and 23 for any core pair, that core pair will be switched, and will thereby store the information as dictated by the input data line 23. The read lines 21 thread alternate cores in each row and the sense lines 22 thread the cores in pairs of columns to provide the same circuit operation for each cell in the array as described in connection with FIGURE 2. This array will write a full row of cells at a time, in accordance with the input data and will also read alternate cells of a row at a time. The array may obviously be modified in accordance with teachings well known in the art to provide coincident current read out of information without departing from these teachings. Furthermore, the array will operate correctly despite severe noise conditions which may exist on the input data lines 23.

The magnetic storage system described herein for the bit storage of information may be used in any conventional matrix or array for providing the desired storage capacity. The arrangement of FIGURE 3 is merely by way of illustration. The noise cancellation circuitry as shown by FIGURES 1 and 2 is the substance of this invention and, while certain modifications and substitutions may be made thereto without departing from the teachings of this invention, reference should be had to the appended claims to determine the true scope of the invention.

We claim:

1. A common mode noise rejection two core per bit magnetic information storage system comprising, a pair of magnetic storage elements each exhibiting substantially square hysteresis loop characteristics whereby either of two magnetic saturation states may be assumed by the element depending upon the polarity of a magneto-motive force applied thereto, write windings threading both said storage elements in the same direction for applying a bit storage switching current to both said storage elements for driving the same to a common state of magnetism, an output sense winding threading both said storage elements but each in different directions whereby noise induced in the sense winding from the pair of storage elements is substantially 180° out of phase, a read winding threading only one of the pair of storage elements for applying thereto a readout pulse extracting the stored information, and a single ended sense amplifier coupled to said output sense winding detecting shifts of only one polarity in the magnetic saturation state of the one storage element in response to readout pulses applied to the read winding.

2. A common mode noise rejection two core per bit magnetic information storage system comprising, a plurality of pairs of magnetic information storage elements each having two stable states of residual magnetism, a pair of write windings threading each pair of storage elements in the same direction to drive the storage elements of each pair to a common magnetic state for bit storage, an output sense winding threading both storage elements of each pair but in opposite directions whereby only energy induced on the sense winding from both storage elements of a pair is suppressed by cancellation, a read winding threading only one of the storage elements of each pair for shifting the magnetic state of the one storage element to release energy inducing an output pulse on the sense winding, and a single ended sense amplifier coupled to the output sense winding to detect said output pulse.

3. A common mode noise rejection two core per bit magnetic storage system for the bit storage of information comprising, a plurality of pairs of magnetic storage elements each having two stable states of residual magnetism, said plurality of pairs of magnetic storage elements being arranged in rows and columns to form an array, a pair of write windings threading each pair of said storage elements in the same direction to drive the storage elements of each pair in the row to a common magnetic state for the bit storage of information, output sense windings threading the storage elements of each pair in opposite directions whereby only noise energy induced on the sense winding from both storage elements of a pair is suppressed by cancellation, a read winding threading alternate cores of a row for shifting the magnetic state of only one storage element of each pair to release energy inducing an output pulse on the sense winding, and single ended sense amplifiers coupled to said output windings to detect the output pulses.

References Cited by the Examiner

UNITED STATES PATENTS

| | | | |
|---|---|---|---|
| 3,003,067 | 10/61 | Myers | 307—88 |
| 3,112,470 | 11/63 | Barrett et al. | 340—174 |
| 3,124,700 | 3/64 | Burns | 307—88 |

IRVING L. SRAGOW, *Primary Examiner.*